United States Patent
Maricic et al.

(10) Patent No.: US 10,250,328 B2
(45) Date of Patent: Apr. 2, 2019

(54) POSITIONING SYSTEM BASED ON VISIBLE LIGHT COMMUNICATIONS

(71) Applicant: General Electric Company, Schenectady, NY (US)

(72) Inventors: Danijel Maricic, Niskayuna, NY (US); David Christopher Shilling, Cleveland, OH (US); Dennis S. Bradley, Twinsburg, OH (US); Michael James Hartman, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 5 days.

(21) Appl. No.: 15/454,936

(22) Filed: Mar. 9, 2017

(65) Prior Publication Data
US 2018/0262270 A1    Sep. 13, 2018

(51) Int. Cl.
*H04W 4/04* (2009.01)
*H04B 10/116* (2013.01)

(52) U.S. Cl.
CPC ............ *H04B 10/116* (2013.01); *H04W 4/04* (2013.01)

(58) Field of Classification Search
CPC combination set(s) only.
See application file for complete search history.

(56) References Cited

U.S. PATENT DOCUMENTS

| 6,360,090 | B1 | 3/2002 | Holcombe et al. |
| 7,148,458 | B2 | 12/2006 | Schell et al. |
| 8,994,814 | B2 | 3/2015 | Ganick et al. |
| 9,287,976 | B2 | 3/2016 | Ganick et al. |
| 2011/0105134 | A1* | 5/2011 | Kim ............ H04W 72/048 455/450 |
| 2011/0243570 | A1* | 10/2011 | Kim ............ H04B 10/114 398/140 |
| 2012/0001567 | A1* | 1/2012 | Knapp ............ H04L 12/282 315/291 |
| 2012/0076509 | A1* | 3/2012 | Gurovich ......... H04B 10/116 398/212 |

(Continued)

OTHER PUBLICATIONS

Alin-Mihai, Toward Environmental-Adaptive Visible Light Communications Receivers for Automotive Applications: A Review, IEEE Sensors Journal, vol. 16, No. 9, May 1, 2016, pp. 2803-2808.*
Trong-Hop Do,An in-Depth Survey of Visible Light Communication Based Positioning Systems,Published: May 12, 2016, Sensors 2016, 16, 678;pp. 1-5, 12, 14.*
Liu, Hugh Sing, et al.; "Positioning beacon system using digital camera and LEDs", IEEE Transactions on Vehicular Technology, vol. 52, Issue 2, pp. 406-419, Mar. 2003.

(Continued)

*Primary Examiner* — David C Payne
*Assistant Examiner* — Omar S Ismail
(74) *Attorney, Agent, or Firm* — GE Global Patent Operation; Nitin Joshi (57) ABSTRACT

A position tracking system includes one or more beacon transmitters and one or more beacon receiver systems configured to be disposed on an object. Each of the one or more beacon receiver systems includes one or more photodetectors configured to receive signals from the one or more beacon transmitters, and an analog-to-digital convertor to convert analog signals received by the one or more photodetectors to digital signals. Each of the one or more beacon receiver systems also includes a memory and a processor configured to execute instructions stored on the memory. The instructions includes receiving signals collected by the one or more photodetectors, converting the received signals to digital signals, and processing the digital signals.

25 Claims, 5 Drawing Sheets

(56) References Cited

U.S. PATENT DOCUMENTS

| | | | | |
|---|---|---|---|---|
| 2013/0141554 | A1* | 6/2013 | Ganick | G01S 1/70 348/61 |
| 2014/0153923 | A1* | 6/2014 | Casaccia | H04B 10/1149 398/58 |
| 2014/0270794 | A1* | 9/2014 | Rothenberg | H04B 10/116 398/118 |
| 2015/0188632 | A1* | 7/2015 | Aoyama | H04B 10/116 398/118 |
| 2015/0377609 | A1* | 12/2015 | Shen | G01B 11/14 356/4.07 |
| 2016/0191159 | A1* | 6/2016 | Aoyama | H04N 21/436 398/172 |
| 2018/0212678 | A1* | 7/2018 | Gummadi | H04B 10/116 |

OTHER PUBLICATIONS

Rajagopal, Sridhar, et al.; "Visible Light Communication: Modulation Schemes and Dimming Support", IEEE communications Magazine, vol. 50, Issue 3, Mar. 2012.

Li, Liqun, et al.; "Epsilon: A Visible Light Based Positioning System", 2014, pp. 1-13, http://www.panhu.me/pdf/Epsilon.pdf.

Cailean et al., "Toward Environmental-Adaptive Visible Light Communications Receivers for Automotive Applications: A Review", IEEE Sensors Journal, vol. 1 6, Issue 9, pp. 2803-2811, May 1, 2016.

Do, Trong-Hop, et al.; "An in-Depth Survey of Visible Light Communication Based Positioning Systems", Sensors, pp. 1-40, http://www.mdpi.com/1424-8220/16/5/678, May 12, 2016.

* cited by examiner

POSITIONING SYSTEM BASED ON VISIBLE LIGHT COMMUNICATIONS

BACKGROUND

The subject matter disclosed herein relates generally to location tracking, and more particularly, to systems and methods for location tracking based on visible light communication (VLC).

Location tracking or positioning in global positioning system (GPS) denied environments such as indoor facilities and/or crowded areas where signals from the satellite may be shielded by armored building structures, is desirable in many applications. For example, indoor positioning is of value in commercial, industrial, and manufacturing facilities, as well as in public venues such as airports and hospitals. Although some forms of indoor positioning are available, they may be limited to short range applications and may be inefficient (e.g., occlusion or intermission of signals). Accordingly, there is a need for systems and methods that can provide indoor location tracking with enhanced efficiency.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a position tracking system includes one or more beacon transmitters and one or more beacon receiver systems configured to be disposed on an object. Each of the one or more beacon receiver systems includes one or more photodetectors configured to receive signals from the one or more beacon transmitters, and an analog-to-digital convertor to convert analog signals received by the one or more photodetectors to digital signals. Each of the one or more beacon receiver systems also includes a memory and a processor configured to execute instructions stored on the memory. The instructions includes receiving signals collected by the one or more photodetectors, converting the received signals to digital signals, and processing the digital signals.

In another embodiment, a position tracking system includes one or more location beacons and one or more beacon receiver systems configured to be disposed on an object. Each of the one or more beacon receiver systems includes one or more photodetectors configured to receive signals from the one or more location beacons, and an analog-to-digital convertor to convert analog signals received by the one or more photodetectors to digital signals. Each of the one or more beacon receiver systems also includes a memory and a processor configured to execute instructions stored on the memory. The instructions include receiving signals collected by the one or more photodetectors, converting the received signals to digital signals, and processing the digital signals. The analog-to-digital converter, the memory, and the processor are on a single integrated circuit chip.

In another embodiment, a method for providing location includes receiving a signal using one or more photodetectors disposed on an object when one or more location beacons are within a field-of-view of the one or more photodetectors. The method includes converting the received signal to a digital signal, processing the digital signal, and determining a beacon identification of the respective location beacon. The method also includes computing a location of the object based on the processed digital signal, and displaying the computed location.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure relates to a location tracking system that provides the locations (e.g., positions and/or orientations) of objects (e.g., vehicles, electronic devices, tools, devices configured to be worn or carried by a person, and so forth) as the objects move or travel within an indoor or GPS denied facility. The location tracking system may include beacon transmitter or location beacons, in the facility, and one or more beacon receivers disposed on or coupled to the objects being tracked, where the beacon transmitters and receivers may communicate based on principles of visible light communication (VLC). The beacon transmitters may be any suitable light sources configured to emit modulated light (e.g., light fixture based, infrared or IR based, ultraviolet or UV based). The beacon receivers may each include one or more photodetectors (e.g., light sensors, infrared or IR sensors, photodiodes, beacon sensors) configured to receive signals emitted from one or more beacon transmitters. It should be noted that the term disposed on or coupled to may refer to being fixed via an adhesive (e.g., glue, adhesive layer), via an applied force (e.g., force applied by a user, gravitational force), or via any other suitable fixing or integrating mechanisms (e.g., a fixture, a snap fit, an interference fit, bolt and screw, hook-and-loop).

The location tracking system may determine the locations (e.g., positions and/or orientations) of the objects using the beacon data or signals collected by the beacon receivers. For example, the location tracking system may be implemented using a controller or a processor, one or more photodetectors, and a fully digital VLC tag circuit for signal processing. The beacon receivers may each include a beacon location map, and the location of the object (e.g., relative to the beacon detected) may be computed at each beacon receiver. Alternatively, the beacon receivers may send beacon data that contains location information or a uniform resource locator (URL) to a remote server where the location computation is performed. For example, the beacon receivers may transmit data (e.g., raw photodetector data, digitally processed beacon data, decoded beacon data) to a server, such as a remote service platform (e.g., cloud service), and the location of the object may be computed or decoded at the server. In addition, the beacon receivers may each include any suitable sensors, such as gyros, accelerometers, magnetometers, and inertial measurement units (IMUS) used in combination with the VLC system to improve location accuracy. It should be noted that the signal processing at each beacon receiver is fully digital rather than analog. Further, the beacon receiver may be implemented on an integrated circuit chip, which may contribute to cost savings and/or reduced device footprint.

Figure 1:
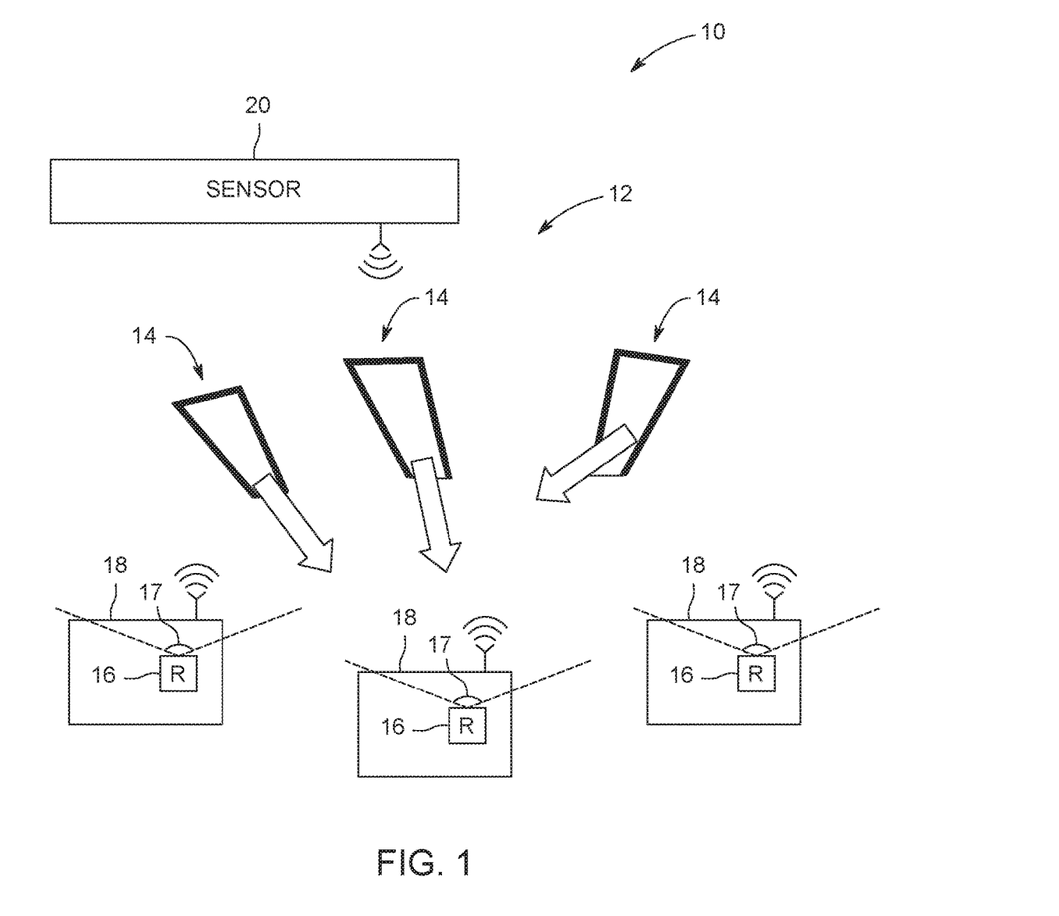
FIG. 1 is an example diagram of a facility having a location tracking system, in accordance with an aspect of the present disclosure.

With the foregoing mind, it may be useful to describe an embodiment of a facility 10 that may employ a location tracking system 12, as depicted in FIG. 1. The facility 10 may be an indoor facility, such a store, a shopping center, a storage facility, a warehouse, a mine, an industrial environment (e.g., a power generation plant, a chemical production plant, a petroleum refinery, a manufacturing facility, a building construction site, and so forth), a medical environment (e.g., a hospital, a magnetic resonance imaging lab), a facility for construction applications (e.g., new building construction, building repairs), and for other similar industrial and/or commercial applications. The facility 10 may also be any suitable global positioning system (GPS) denied environments.

As further depicted in FIG. 1, the location tracking system 12 may include one or more beacon transmitters or VLC beacon transmitter 14, such as light fixtures, configured to emit modulated light containing beacon data. The beacon data may contain location information or description and/or a uniform resource locator (URL). The location tracking system 12 may include one or more beacon receiver systems 16 disposed on or coupled to one or more objects 18 being tracked. The objects 18 may be personnel (e.g., miners, engineers, field technicians, supervisors, contractors, emergency and safety teams) and/or equipment (e.g., vehicles, carts, mining machines, tools, devices, electronic devices, handheld tools, handheld devices, wearable equipment/devices such as hardhats and headlamp assemblies). In certain embodiments, the beacon transmitters 14, such as light fixtures, may be disposed in the ceiling or any suitable locations to broadcast the location information. In certain embodiments, the beacon transmitters 14 may be IR-based or UV-based. The beacon receiver systems 16 are configured to detect the modulated light emitted by the beacon transmitters 14, process the beacon data, and/or perform location computation, as will be discussed in FIG. 2. The location tracking system 12 may include a server 20, such as a remote service platform (e.g., cloud service). In some embodiments, the beacon receiver systems 16 may be communicatively coupled to the server 20, and beacon data that contains location information and/or URL may be sent to the server 20. For example, while at least a portion of the beacon data processing and/or analysis is performed at each beacon receiver system 16, location computation may be performed at the server 20.

Figure 2:
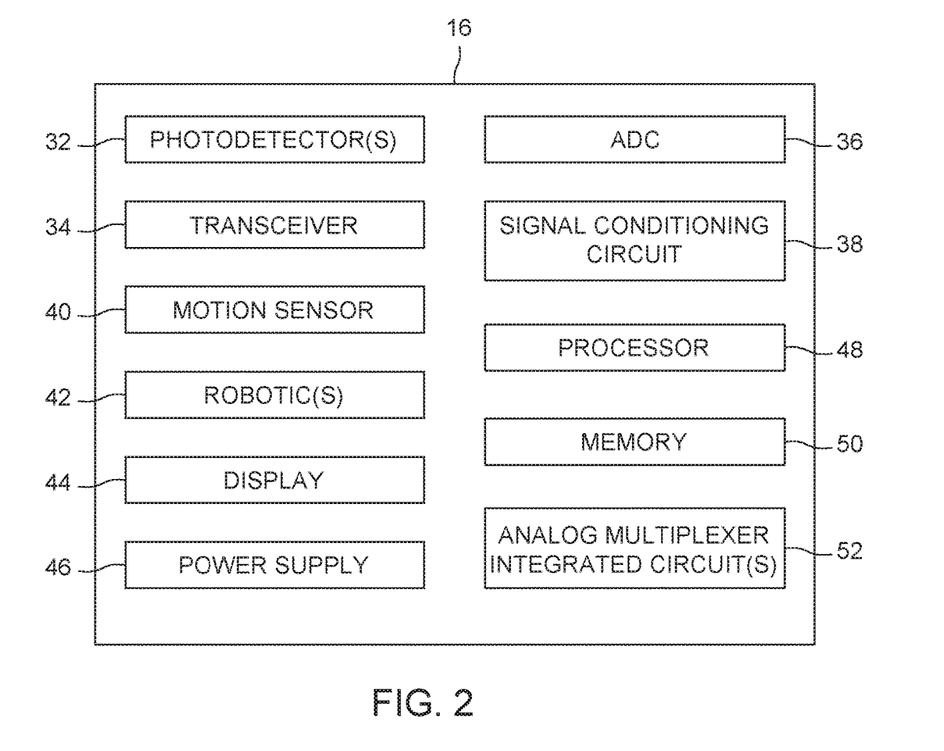
FIG. 2 is a block diagram of a receiver system of the location tracking system of FIG. 1, in accordance with an aspect of the present disclosure.

Turning now to FIG. 2, a block diagram of the beacon receiver system 16 for receiving and processing location beacon data encoded using VLC is depicted. In the illustrated embodiment, the beacon beacon receiver system 16 may include one or more photodetectors 32, such as light sensors, IR sensors, or photodiodes, configured to detect the modulated light emitted by the beacon transmitters 14 (e.g., light fixture based, IR-based, or UV-based). The beacon receiver system 16 may include a transceiver 34, such as a VLC transceiver, a RF transceiver, or other low-power transceiver, configured to communicatively couple to the server 20. The beacon beacon receiver system 16 may include an analog-to-digital converter or ADC 36 coupled to the one or more photodetectors 32 to convert analog signals received by the one or more photodetectors 32 to digital signals. The beacon receiver system 16 may include a signal conditioning circuit 38 coupled to the ADC 36. In some embodiments, the signal conditioning circuit 38 may include circuitry for direct current (DC) offset removal from the photo signal (e.g., signal from the one or more photodetectors 32). The DC offset refers to a mean amplitude displacement from zero, which may be seen as an offset of the recorded waveform away from the center zero point. In certain embodiments, the DC offset is removed (e.g., to remove a potential source of distortion and/or loss of photo signal). In some embodiments, the signal conditioning circuit 38 may include an automatic gain adjustment to maximize the signal at the ADC input (e.g., signal form the one or more photodetectors 32).

The beacon receiver system 16 may include a motion sensor 40 (e.g., an inertial measurement (IMU), an accelerometer, a gyro, a magnetometer), one or more robotics 42 (e.g., unmanned aerial vehicles (UAV) and/or other suitable robotics 44), a display 44, and a power supply 46 (e.g., batteries or an electrical supply or grid of the object 18 being tracked). The beacon receiver system 16 may include a processor 48 communicatively and/or operatively coupled to various components of the beacon receiver system 16 (e.g., the one or more photodetectors 32, the transceiver 34, the ADC 36, the signal conditioning circuit 38, the motion sensor 40, the robotics 42, the display 44, the power supply 46). The processor 48 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits.

The beacon receiver system 16 may include a memory 50 communicatively coupled to the processor 48. The memory 50 (e.g., a non-transitory computer-readable medium/ memory circuitry) may include volatile memory, such as random access memory (RAM), and/or non-volatile memory, such as read-only memory (ROM), optical drives, hard disc drives, or solid-state drives. The memory 50 may store data or information, algorithm(s), and one or more sets of instructions (e.g., processor-executable instructions) implemented to perform operations related to the beacon receiver system 16. For example, the memory 50 may store a map or layout of the facility 10 (e.g., including coordinates or locations of the one or more beacon transmitters 14). For example, the memory 50 may store instructions to obtain information (e.g., information related to locations of the one or more objects 18) from various components (e.g., the one or more photodetectors 32, the transceiver 34, the motion sensor 40, the robotics 42) of the beacon receiver system 16, and store the obtained information in the memory 50. The information may be data collected and/or computed via the beacon receiver system 16. Further, the memory 50 may store algorithm(s) to process, analyze, and/or compute or determine location of the respective object 18 based on the data collected via the respective beacon receiver system 16.

In certain embodiments, the motion sensor 40 may be used in combination with the one or more photodetectors 32 for collecting data related to location information. For example, the motion sensor 40 may continuously collect data (e.g., position, velocity, acceleration, etc.) or collect data upon receiving instruction(s) from the processor 48, and the collected data may be analyzed in combination with the beacon data for computing location of the respective object 18. In certain embodiments, the robotics 42 may be used in combination with the one or more photodetectors 32 for collecting data related to location information. For example, the robotics 42 may collect data (e.g., image, photo, video) upon receiving instruction(s) from the processor 48, and the collected data may be used in combination with the beacon data for determining location of the respective object 18. In certain embodiments, the display 44 may be used to show the computed location of the respective object 18 upon receiving instruction(s) from the processor 48.

In some embodiments, the one or more photodetectors 32 may be directly coupled to the processor 48 of the beacon receiver system 16 if there are enough analog inputs at the processor 48. Alternatively, the beacon receiver system 16 may include one or more analog multiplexer integrated circuits 52 configured to select and sample one of the photodetector 32 at a time. For example, more than one analog multiplexer integrated circuits 54 may be used if there are multiple analog inputs at the processor 48. The various components of the beacon receiver system 16 may be powered by the power supply 46. In certain embodiments, power consumption of the power supply 46 may be reduced by using the motion sensor 40 to trigger or activate the beacon receiver system 16 when needed. For example, the beacon receiver system 16 may be activated (e.g., switched from an off- or idle-state to an on-state) when the motion sensor 40 detects motion of the respective object 18.

As set forth above, the motion sensor 40 may be used in combination with the one or more photodetectors 32 to improve accurate determination of location of the respective object 18. In certain embodiments, each of the one or more photodetectors 32 may be disposed on the respective object 18 at a different angle relative to the one or more beacon transmitter 14 such that the one or more photodetectors 32 collectively cover a large beacon data receiving field-of-view (FOV), as represented by angle 17 in FIG. 1. For example, each photodetector 32 may cover a FOV, and combining more than one photodetectors 32 may provide a collective FOV that is larger than a FOV of the individual photodetector 32. In certain embodiments, there may be more than one beacon transmitters 14 detected within a photodetector's FOV. In this case, the strongest signal received by the photodetector 32 may be used for location computation. As may be appreciated, having one or more photodetectors 32 having the same or different FOVs may reduce the chance of signal occlusion or intermission.

In certain embodiments, each beacon receiver system 16 may include two photodetectors 32. The collective FOV from two photodetectors 32 may be larger than the FOV of a single photodetector 32. In certain embodiments, the photodetector 32 may have a FOV of about 180 degrees (e.g., an angle of 180 degrees), and two photodetectors 32 may provide a collective FOV substantially larger than about 180 degrees (e.g., between about 180 degrees and about 360 degrees). In certain embodiments, the beacon receiver system 16 may include three photodetectors 32. It may be appreciated that in general the more photodetectors 32 that are used, the more accurate location computation may be. For example, a larger number of photodetectors 32 may cover a wider collective FOV with each of the photodetector 32 covering a relatively narrower FOV.

In certain embodiments, the photodetectors 32 may be disposed more densely along certain orientation of the object 18 to cover a particular FOV, and may be disposed sparsely along a different orientation of the object 18 to cover a different FOV. For example, the accuracy of the location computation may depend more on signals collected via the vertically oriented photodetectors 32 when the motion of the tracked object 18 is horizontal (e.g., relative to the floor or ground) and the beacon transmitters 14 are disposed at a vertical elevation (e.g., at a ceiling or in proximity of a ceiling). As such, it may be more efficient (e.g., to optimize data processing and/or to reduce the amount of data being collected) to arrange the one or more photodetectors 32 such that the photodetectors 32 pointing closer to a vertical axis (e.g., vertical relative to the ground or floor) are more densely distributed and the photodetectors 32 pointing closer to a horizontal axis (e.g., horizontal relative to the ground or floor) are more sparsely distributed. For example, the one or more photodetectors 32 having high elevation angle(s) (e.g., photodetectors 32 disposed on a top surface of the object 18) may each have a relatively wider FOV, and the one or more photodetectors 32 having low elevation angle(s) (e.g., photodetectors 32 disposed around side surface(s) of the object 18) may each have a relatively narrower FOV. For example, the FOV of the photodetector 32 may increase as the elevation angle of the photodetector 32 increases.

In certain embodiments, the data collected by the one or more photodetectors 32 and/or by the motion sensor 40 may be digitally processed and transmitted to the server 20 via the transceiver 40, and the location of the respective object 18 may be computed at the server 20. For example, the processed data (e.g., digital signals) may be communicated to the server 20 in real time or offline, and location computation may be performed at the server 20 based on these data. The communicated data may include the detected beacon or VLC identification data (ID) associated with the photodetector ID that received the beacon data, along with the light signal level and received signal strength (e.g., modulation amplitude).

Figure 3:
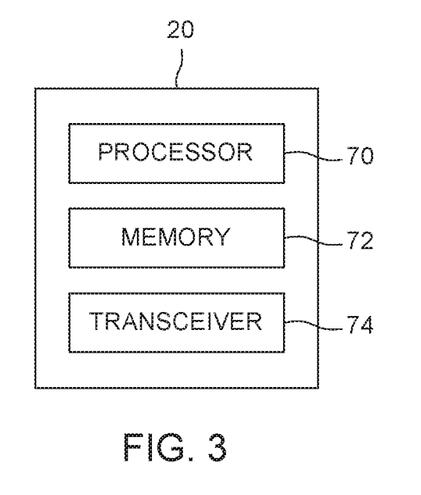
FIG. 3 is a block diagram of a server of the location tracking system of FIG. 1, in accordance with an aspect of the present disclosure.

FIG. 3 shows a block diagram of the server 20 that is communicatively coupled to the one or more beacon receiver systems 16 to receive location related data or information from the one or more beacon receiver systems 16 and to compute location of the respective object 18. In the illustrated embodiment, the server 20 may include a processor 70, a memory 72 communicatively coupled to the processor 70, and a transceiver 74 communicatively and operatively coupled to the processor 70. The processor 70 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits. The transceiver 74 may be a VLC transceiver, a RF transceiver, or other low-power transceiver to allow the server 20 to wirelessly communicate data with the one or more beacon receiver systems 16.

The memory 72 (e.g., a non-transitory computer-readable medium/memory circuitry) may include volatile memory, such as random access memory (RAM), and/or non-volatile memory, such as read-only memory (ROM), optical drives, hard disc drives, or solid-state drives. The memory 72 may store data or information, algorithm(s), and one or more sets of instructions (e.g., processor-executable instructions) implemented to perform operations related to the location tracking system 12. For example, the memory 72 may store a map or layout of the facility 10 (e.g., including coordinates or locations of the one or more beacon transmitters 14). For example, the memory 72 may store instructions to obtain information (e.g., information related to locations of the one or more objects 18) from the one or more beacon receiver systems 16, and store the obtained information in the memory 72. The information may be raw data collected and/or data processed via the one or more beacon receiver systems 16 (e.g., digital data). It should be noted that the information communicated to the server 20 via the the transceiver 74 is digital data instead of analog data. In certain embodiments, the memory 72 may store algorithm(s) to compute or determine locations of the one or more objects 18 based on the data collected and/or processed via their respective beacon receiver systems 16. The processed data and/or computed locations may be communicated to the one or more beacon receiver systems 16 via the transceiver 74.

Figure 4:
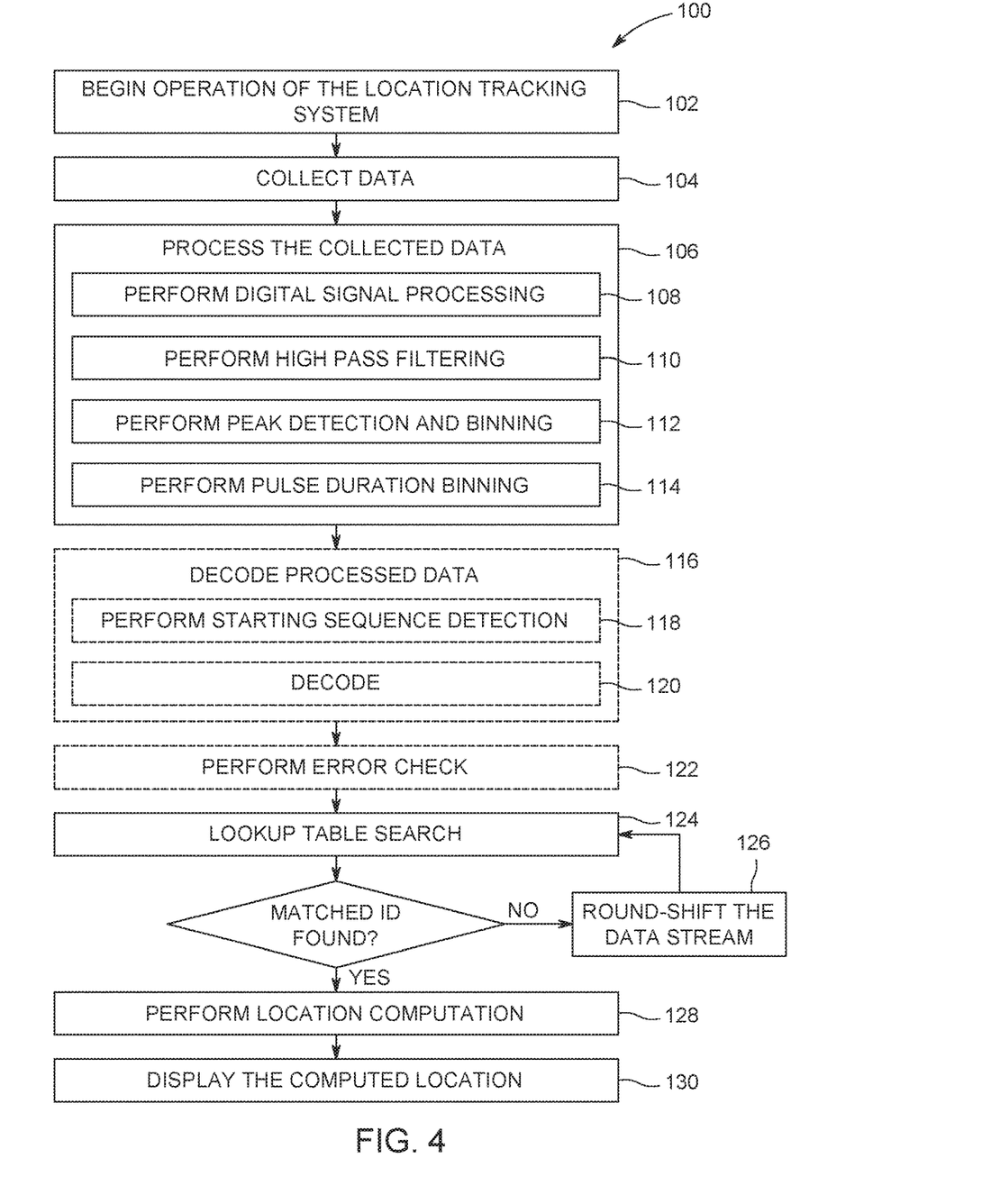
FIG. 4 is a flow chart illustrating a process for utilizing the location tracking system to provide location tracking with fully digital signal processing, in accordance with an aspect of the present disclosure.

FIG. 4 is a flow diagram illustrating a method 100 for determining location using the location tracking system 12 in FIG. 1. One or more steps of the method 100 may be executed by the processor 48 of the beacon receiver system 16 and/or by the processor 70 of the server 20 (e.g., depending at least in part on where the location computation is performed). For example, some or all of the steps of the method 100 may be stored in the memory 50 of the respective beacon receiver system 16 and/or in the memory 72 of the server 20. The method 100 may include beginning operation of the location tracking system 12 (step 102). The operation of the location tracking system 12 may begin upon presence(s) of movements of the one or more objects 18 having the respective beacon receiver systems 16 coupled thereto. For example, the location tracking system 12 may be activated (e.g., all components and/or systems of the location tracking system 12 are turned on and ready to collect, receive, process, and transmit data) when the one or more objects 18 enter or maneuver in the facility 10. For example, the movement(s) of the one or more objects 18 may be detected via the respective motion sensor 40 and thereby triggers activation of the location tracking system 12. Alternatively, the location tracking system 12 may be activated (e.g., via a control signal) and stay activated until deactivation.

The method 100 may include collecting data (step 104) that may include collecting data from the one or more photodetectors 32 and collecting data from the motion sensor 34. For example, each beacon receiver system 16 may collect data transmitted by the one or more beacon transmitters 14 using the one or more photodetectors 32 every time the respective object 18 comes close to the beacon transmitters 14 (e.g., the beacon transmitter 14 is within the photodetector's receiving FOV 17). For example, each beacon receiver system 16 may continuously or in any suitable intervals (e.g., seconds, minutes) collect data using the respective motion sensor 34.

The method 100 may include processing the collected data (step 106) that may include performing digital signal processing (step 108), performing high pass filtering (step 110), performing peak detection and binning (step 112), and performing pulse duration binning (step 114). In step 108 (performing digital signal processing algorithm), the ADC 36 may convert the data collected by the one or more photodetectors 32 from analog signals to digital signals. The ADC 36 may sample the data collected via the one or more photodetectors 32, and depending on the encoding scheme, the ADC 36 may add a preamble or physical layer (PHY) header to the collected data. For example, the ADC 36 may add data relating to one or more beacon IDs to the collected data.

In step 110 (performing high pass filtering), the direct current (DC) offset and/or low frequency variations are removed from the data (e.g., via the signal conditioning circuit 38). In step 110, a band pass filter may be used to reduce highest frequencies and/or to remove noises in the data.

In step 112 (performing peak detection and binning), the filtered signal peaks that are above or below pre-set peak detection thresholds for each set of the filtered data are identified. For example, the peak detection threshold may be set relative to the highest peak of the filtered data (e.g., sensor stream) for detecting positive peaks. For example, the peak detection threshold may be set to about 0.5 of the maximum peak or set to any other suitable values. For example, the negative peak detection threshold may be set to the highest negative peak of the filtered data. As may be appreciated, if the one or more beacon transmitters 14 produce light transitions of similar rising and falling times, the high pass filtering discussed in step 110 may have positive and negative peaks of similar absolute amplitude. In certain embodiments, if there are multiple beacon signals detected simultaneously, more than one peak detection threshold level may be set to separate beacon signals. In certain embodiments, if error check or error correction is employed in data processing, the signals may be separately checked. In certain embodiments, the peak detection threshold(s) may be changed to greater or lower values based at least in part on the outcome of location computation (e.g., data decoding) processing.

In step 114 (performing pulse duration binning), the time between two adjacent peaks or pulses of either sign (e.g., positive and negative, both positive, or both negative) may be measured. Subsequently, the time durations are binned in at least two bins depending on the encoding scheme or dimming levels of the beacon transmitters 14. For example, if the beacon transmitters 14 are encoded with constant duty cycle such that only pulses with positive signs or only pulses with negative signs may be detected, the time durations between two adjacent positive pulses or between two negative pulses are measured.

The method 100 may include decoding processed data (step 116) that may include performing starting sequence detection (step 118) and decoding (step 120). As may be appreciated, in certain embodiments, a start sequence is present at the beginning of the VLC data transmission, and the start sequence may be detected by comparing the duration of the pulses with the expected start pattern (step 118). In step 120, data decoding is performed after the start sequence is detected in the processed stream, and the decoding scheme may correspond to the encoding performed at the beacon transmitter 14. For example, the coding scheme may include an On-Off Keying (OOK) modulation scheme, a Pulse Position Modulation (PPM) coding scheme, a Manchester (or bi-phase) coding scheme, a Miller coding scheme, or any other suitable coding schemes. In certain embodiments, step 116 (including steps 118 and 120) may be omitted. For example, step 116 may be omitted in cases that the VLC beacon data is transmitted by the beacon transmitter 14 repetitively in an infinite loop without start or stop sequences.

The method 100 may include performing error check (step 122). As may be appreciated, the error check may be done using parity bits or error correction may be performed. In certain embodiment, step 122 may be omitted.

The method 100 may include a lookup table search (step 124) that the processed or processed/decoded data (e.g., data stream) generated in the previous steps (step 106 and/or step 116) is compared to a lookup table stored in the memory (e.g., memory 50) to find matching VLC beacon ID(s). In certain embodiments, in the absence of data encoding, the data stream generated by the pulse duration binning process (e.g., step 114) may be used to find a matched ID from the lookup table stored in the memory (e.g., memory 50). As may be appreciated, in the absence of an encoded start sequence and when the one or more beacon transmitters 14 are configured to transmit signal (e.g., beacon data) in an infinite loop, there may be no notion at the one or more beacon receiver systems 16 indicative of the beginning of the beacon data. As such, in certain embodiments, the step 124 (lookup table search) may include a step 126 to round-shift the data stream generated by the pulse duration binning process (step 114) to find a matched ID (step 124). It should be noted that the round shifting process (step 126) may be repeated until a matched ID is found.

The method 100 may include performing location computation (step 128). Upon determination of the VLC beacon ID, the location (e.g., position and/or orientation) of the respective object 18 may be computed based on the processed beacon data received over time (e.g., received by the beacon receiver system 16) and a beacon location map stored in the memory (e.g., memory 50, memory 72). In certain embodiments, if the beacon receiver system 16 includes the motion sensor 40, the data collected via the motion sensor 40 may also be used in the location computation process (step 128), which may improve the accuracy of the location computation. As set forth above, the location computation process (step 128) may be performed at the one or more beacon receiver systems 16 (e.g., by the processor 48), or may be performed at the server 20 (e.g., by the processor 70). For example, the processed VLC data (e.g., data including timestamps) and/or the data collected by the motion sensor 40 may be sent to the server 20 via the transceiver 34, and the location computation may be computed at the server 20 (e.g., by the processor 70).

The method 100 may include displaying the computed location (step 130). The computed location may be shown on the display 44 of the respective beacon receiver system 16. The computed location may be displayed and updated continuously or in any suitable time intervals (e.g., seconds, minutes, hours, etc.). In certain embodiments, authorized user(s) may have access to the receiver system(s) 16 and/or the server 20 to obtain location related information and/or the computed location.

It should be noted that digital signal processing rather than analog signal processing is performed in the processes set forth in steps 106, 116, 122, and 124. In particular, rather than using analog circuitry, only digital signal processing is performed in signal conditioning (e.g., steps 106, 116, 122, and 124). This may contribute to cost reduction in making the VLC receiver (e.g., the one or more beacon receiver systems 16) and/or reducing the device footprint. For example, the beacon receiver system 16 may be implemented on an integrated circuit chip, a single controller or microcontroller, such as the processor 48, to save cost and/or device footprint.

Figure 5:
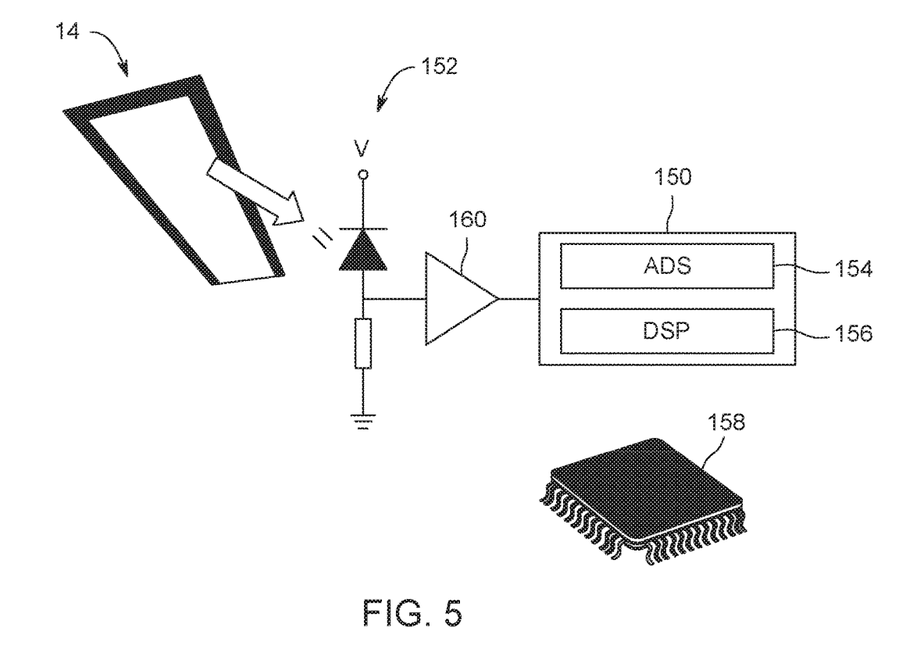
FIG. 5 is an example schematic of implementation of a receiver system of the location tracking system of FIG. 1 on an integrated circuit chip.

FIG. 5 is a schematic illustrating an embodiment of a controller or microcontroller board that may be used for VLC ID decoding (e.g., as a digital VLC decoder). In the illustrated embodiment, a digital VLC decoder 150 may be coupled to a photodetector 152 (e.g., a light sensor, an infrared or IR sensor, a photodiode, a beacon sensor). The digital VLC decoder 150 may include an ADC 154 (e.g., ADC 36 of FIG. 2) and a digital signal processor (DSP) 156 (e.g., processor 48 of FIG. 2). The VLC decoder 150 may include any other suitable elements as discussed in FIG. 2. The DSP 156 may be coupled to the ADC 154 and/or any suitable elements as discussed in FIG. 2.

The ADC 154 is coupled to the photodetector 152 (e.g., photodetector 32 of FIG. 2) to convert the analog signal received by the photodetector 152 to digital signals. The digital VLC decoder 150 is configured to be implemented in the beacon receiver system 16. Furthermore, the digital VLC decoder 150 may be implemented on a single integrated circuit (IC) chip or die 158. For example, the digital VLC decoder 150 may be an 8-bit microcontroller having 32 kB of flash memory and 2 kB of RAM. In certain embodiments, the footprint of the digital VLC decoder 150 may be small enough or sized to fit under the photodetector 152. In certain embodiments, the photodetector 152 may be integrated on the same IC chip 158. For example, the photodetector 152 may be integrated on the IC chip 158 if an image sensor complementary metal-oxide-semiconductor (CMOS) technology process is used. In certain embodiments, the digital VLC decoder 150 may be coupled to a signal amplifier 160 that coupled to the photodetector 152. In certain embodiments, the IC chip 158 may be an Arduino board.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A position tracking system, comprising:
one or more beacon transmitters;
one or more beacon receiver systems configured to be disposed on an object, and wherein each of the one or more beacon receiver systems comprises:
a motion sensor to collect motion data of the object;
a plurality of photodetectors configured to receive signals from the one or more beacon transmitters;
an analog-to-digital convertor to convert analog signals received by the plurality of photodetectors to digital signals;
a memory; and
a processor configured to execute instructions stored on the memory comprising instructions for:
receiving signals collected by the plurality of photodetectors;
converting the received signals to digital signals;
processing the digital signals;
computing a location of the object based on an analysis of combination of the processed digital signals and the motion data of the object; and
wherein the plurality of photodetectors are disposed densely along a vertical axis as compared to the plurality of photodetectors disposed along a horizontal axis.

2. The position tracking system of claim 1, wherein the one or more beacon transmitters and each of the plurality of photodetectors communicate based on visible light communication (VLC).

3. The position tracking system of claim 1, wherein each of the one or more beacon transmitters is a visible light transmitter, an infrared (IR) transmitter, or an ultraviolet (UV) transmitter.

4. The position tracking system of claim 1, wherein each of the plurality of photodetectors is a light sensor, an IR sensor, a photodiode, or a beacon sensor.

5. The position tracking system of claim 1, wherein processing the digital signals comprises performing high pass filtering, performing peak detection and binning, performing pulse duration binning, and looking up one or more beacon identification data.

6. The position tracking system of claim 1 comprises a remote server that is communicatively coupled to the one or more beacon receiver systems.

7. The position tracking system of claim 6, wherein processing the digital signals comprises transmitting processed digital data to the remote server where location computation is performed by a processor of the remote server based at least in part on the processed digital data.

8. The position tracking system of claim 1, wherein the field-of-view of the plurality of photodetectors increases with an elevation angle of the respective photodetector.

9. A position tracking system, comprising:
one or more location beacons;
one or more beacon receiver systems configured to be disposed on an object, and wherein each of the one or more beacon receiver systems comprises:
a motion sensor to collect motion data of the object;
a plurality of photodetectors configured to receive signals from the one or more location beacons;
an analog-to-digital convertor to convert analog signals received by the plurality of photodetectors to digital signals;
a memory;
a processor configured to execute instructions stored on the memory comprising instructions for receiving signals collected by the plurality of photodetectors;
converting the received signals to digital signals;
processing the digital signals; and computing a location of the object based on an analysis of combination of the digital signals and the motion data of the object, wherein the analog-to-digital converter, the memory, and the processor are on a single integrated circuit chip; and
wherein the one or more beacon receiver systems comprise a plurality of analog multiplexer integrated circuits configured to select and sample one photodetector from the plurality of photodetectors at a time.

10. The position tracking system of claim 9, wherein each of the one or more location beacons is configured to emit modulated visible light.

11. The position tracking system of claim 9, wherein each of the one or more location beacons is a light fixture.

12. The position tracking system of claim 9, wherein the plurality of photodetectors comprises at least two different field-of-views.

13. The position tracking system of claim 9, wherein a photodetector is integrated on the integrated circuit chip.

14. The position tracking system of claim 9, wherein the one or more receiver systems are communicatively coupled to a remote server and location computation based at least in part of the processed digital signals is performed at the one or more beacon receiver systems or at the remote server.

15. The position tracking system of claim 9, wherein the one or more beacon receiver systems are disposed on a moveable object with in a facility.

16. A method for providing location comprising:
providing one or more beacon transmitters;
receiving a signal from one or more beacon transmitters using a plurality of photodetectors disposed on one or more beacon receiver systems when one or more location beacons are within a field-of-view of the plurality of photodetectors, wherein the one or more beacon receiver systems are disposed on an object;
collecting motion data of the object;
converting the received signal to a digital signal;
processing the digital signal;
determining a beacon identification of the respective location beacon;
computing a location of the object based on the processed digital signal and motion data of the object;
displaying the computed location; and
wherein processing the digital signal comprises:
performing digital signal processing;
performing high pass filtering;
performing peak detection and binning; and
performing pulse duration binning.

17. The method of claim 16, wherein computing the location is performed by a processor disposed on the object.

18. The method of claim 16, wherein computing the location is performed by a processor at a remote server.

19. The method of claim 16, wherein converting the received signal, processing the digital signal, and determining the beacon identification of the respective location are performed by a single integrated circuit chip.

20. The method of claim 16, comprising decoding the processed signal.

21. The method of claim 20, comprising: performing starting sequence detection and decoding.

22. The method of claim 16, comprising performing error check.

23. The position tracking system of claim 1, wherein the one or more beacon receiver systems comprise a plurality of analog multiplexer integrated circuits configured to select and sample one photodetector from the plurality of photodetectors at a time.

24. The position tracking system of claim 1, wherein the one or more beacon receiver systems is switched from an off or idle state to an on state when the motion sensor detects motion of the object.

25. The position tracking system of claim 1, wherein the plurality of photodetectors provide a collective field-of-view (FOV) that is larger than a FOV of the individual photodetector of the plurality of photodetectors.

* * * * *